(12) United States Patent
Yosui et al.

(10) Patent No.: US 9,947,987 B2
(45) Date of Patent: *Apr. 17, 2018

(54) ANTENNA APPARATUS AND COMMUNICATION TERMINAL

(71) Applicant: Murata Manufacturing Co., Ltd., Nagaokakyo-shi, Kyoto-fu (JP)

(72) Inventors: Kuniaki Yosui, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,157

(22) Filed: Dec. 21, 2016

(65) Prior Publication Data

US 2017/0104259 A1   Apr. 13, 2017

Related U.S. Application Data

(63) Continuation of application No. 13/558,747, filed on Jul. 26, 2012, now Pat. No. 9,595,749, which is a (Continued)

(30) Foreign Application Priority Data

Apr. 12, 2010   (JP) ................................ 2010-091086

(51) Int. Cl.
*H01Q 1/22* (2006.01)
*G06K 19/077* (2006.01)
(Continued)

(52) U.S. Cl.
CPC ..... *H01Q 1/2216* (2013.01); *G06K 19/07777* (2013.01); *H01Q 1/2291* (2013.01);
(Continued)

(58) Field of Classification Search
CPC ... H01Q 1/2216; H01Q 1/2291; H04B 5/0081
See application file for complete search history.

(56) References Cited

U.S. PATENT DOCUMENTS 7,183,987 B2 * 2/2007 Akiho .................. G06K 7/0008
343/742
7,495,625 B2 * 2/2009 Endo .................. G06K 7/10336
340/572.5

FOREIGN PATENT DOCUMENTS

JP       2009182630 A   *   8/2009

OTHER PUBLICATIONS

Yosui et al., "Antenna Apparatus and Communication Terminal", U.S. Appl. No. 13/558,747, filed Jul. 26, 2012.

* cited by examiner

*Primary Examiner* — Jessica Han
*Assistant Examiner* — Amal Patel
(74) *Attorney, Agent, or Firm* — Keating & Bennett, LLP

(57) ABSTRACT

An antenna apparatus includes a power supply coil, a booster electrode sheet, a magnetic sheet, and a ground substrate arranged in this order from the top. The power supply coil includes a spiral coil conductor located on a flexible substrate. The booster electrode sheet includes a booster electrode located on an insulating substrate. The booster electrode includes a conductor region covering the coil conductor, a conductor aperture covering a coil window, and a slit portion connecting the outer edge of the conductor region and the conductor aperture in plan view. The magnetic sheet covers the booster electrode sheet so that the magnetic sheet covers a region slightly larger than a region including the conductor aperture and the slit portion of the booster electrode.

8 Claims, 13 Drawing Sheets

Related U.S. Application Data continuation of application No. PCT/JP2011/054088, filed on Feb. 24, 2011.

(51) Int. Cl.
    *H01Q 7/06*     (2006.01)
    *H01Q 1/38*     (2006.01)
    *H04B 5/00*     (2006.01)

(52) U.S. Cl.
    CPC ............... *H01Q 1/38* (2013.01); *H01Q 7/06* (2013.01); *H04B 5/0037* (2013.01); *H04B 5/0081* (2013.01)

ANTENNA APPARATUS AND COMMUNICATION TERMINAL

BACKGROUND OF THE INVENTION

1. Field of the Invention

The present invention relates to an antenna apparatus that communicates with another apparatus with an electromagnetic signal and is preferably for use in an RFID system and a short-range wireless communication system, and a communication terminal including the antenna apparatus.

2. Description of the Related Art

In RFID systems and short-range wireless communication systems that have been increasingly used in recent years, in order to allow a mobile electronic apparatus such as a mobile telephone to communicate with another mobile electronic apparatus or a reader/writer, communication antennas are included in these mobile electronic apparatuses and the reader/writer. Japanese Unexamined Patent Application Publication No. 2006-270681 discloses an antenna included in a mobile electronic apparatus.

FIG. 1 is a diagram illustrating a manner in which a mobile information terminal 21 disclosed in Japanese Unexamined Patent Application Publication No. 2006-270681 and a reader/writer communicate with each other when they are in close proximity to each other. In an example shown in FIG. 1, a portion of a magnetic field H of an electromagnetic wave emitted from a transmission/receiving antenna portion 26 in the reader/writer is reflected or absorbed under the effect of a metal body such as a battery pack 25 in a terminal body 22 and is attenuated. A metal layer 30 is nearer to an electromagnetic wave enter side than a communication surface CS of an antenna module 10. When a magnetic field is externally applied to the surface of the metal layer 30, an induced current (eddy current) occurs on the surface of the metal layer 30 and a magnetic field H1 is generated. The magnetic field H1 generates an induced current at an antenna coil 15 in the antenna module 10.

In this example, by disposing the metal layer 30 so that it covers a portion of the antenna coil 15 and faces the antenna module 10 in close proximity to the antenna module 10, the transmission/receiving antenna portion 26 in the reader/writer and the antenna coil 15 in the antenna module 10 are inductively coupled via the magnetic field component H1 generated at the metal layer 30.

The antenna apparatus illustrated in FIG. 1 solves a problem that a communication characteristic is markedly changed by a misalignment between the center of an antenna included therein and the center of an antenna included in a communication partner when these antennas are very close to each other. In order to prevent a magnetic flux being linked to the antenna coil 15 in the antenna module 10 in the mobile information terminal 21 and the transmission/receiving antenna portion 26 in the reader/writer from being interrupted by a metal body such as the battery pack 25, the metal layer 30 is arranged to generate the magnetic flux. Accordingly, depending on the position of an interrupter such as the battery pack 25, a significant effect may not be obtained.

Furthermore, the metal layer 30 may not be effective in increasing a communication range when an antenna in an antenna apparatus and an antenna in a communication partner are spaced apart from each other.

SUMMARY OF THE INVENTION

Preferred embodiments of the present invention provide an antenna apparatus capable of stably communicating with a communication partner and increasing the maximum possible communication range even when an antenna included therein is smaller than an antenna included in the communication partner.

An antenna apparatus according to a preferred embodiment of the present invention includes a power supply coil including a loop or spiral coil conductor including a coil window at a winding center, a booster electrode that faces the power supply coil and includes a conductor aperture and a slit portion connected to the conductor aperture, a conductor layer facing the power supply coil or the booster electrode, and a magnetic layer disposed between the power supply coil or the booster electrode and the conductor layer. The magnetic layer covers the conductor aperture and the slit portion of the booster electrode in plan view of the power supply coil, the booster electrode, the conductor layer, and the magnetic layer.

A communication terminal according to a preferred embodiment of the present invention includes an antenna apparatus. The antenna apparatus includes a power supply coil including a loop or spiral coil conductor including a coil window at a winding center, a booster electrode that faces the power supply coil and includes a conductor aperture and a slit portion connected to the conductor aperture, a conductor layer facing the power supply coil or the booster electrode, and a magnetic layer disposed between the power supply coil or the booster electrode and the conductor layer. The magnetic layer covers the conductor aperture and the slit portion of the booster electrode in plan view of the power supply coil, the booster electrode, the conductor layer, and the magnetic layer.

According to a preferred embodiment of the present invention, a current flows through a booster electrode while interrupting a magnetic field generated by a current flowing through a coil conductor. A current flowing around a conductor aperture of the booster electrode flows to the outer edge of the booster electrode via a periphery of a slit portion. An induced current having the same direction as that of the current flowing around the booster electrode is generated at a conductor layer. As a result, the strength of magnetic fields generated from a power supply coil, the booster electrode, and the conductor layer is increased, and a communication range is also increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

An antenna apparatus according to the first preferred embodiment and a communication terminal including the antenna apparatus will be described with reference to FIGS. 2 to 6.

Figure 1:
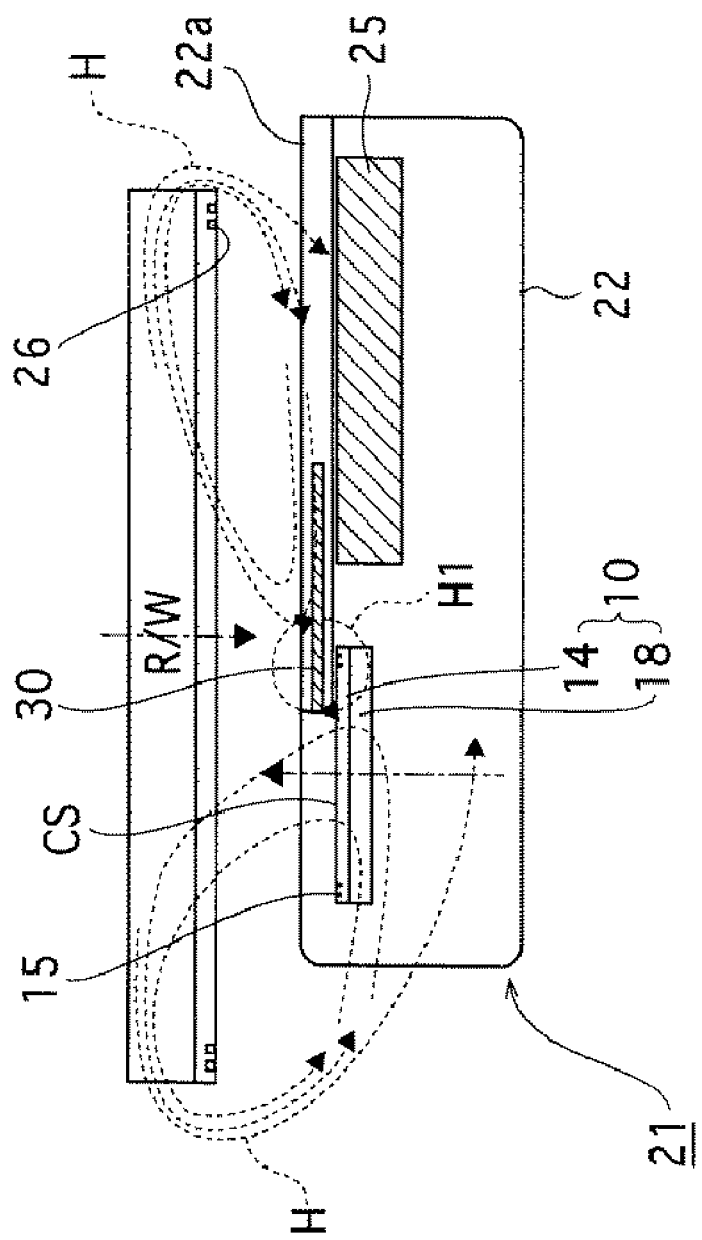
FIG. 1 is a diagram illustrating a manner in which a mobile information terminal 21 and a reader/writer communicate with each other when they are in close proximity to each other in Japanese Unexamined Patent Application Publication No. 2006-270681.
Figure 2:
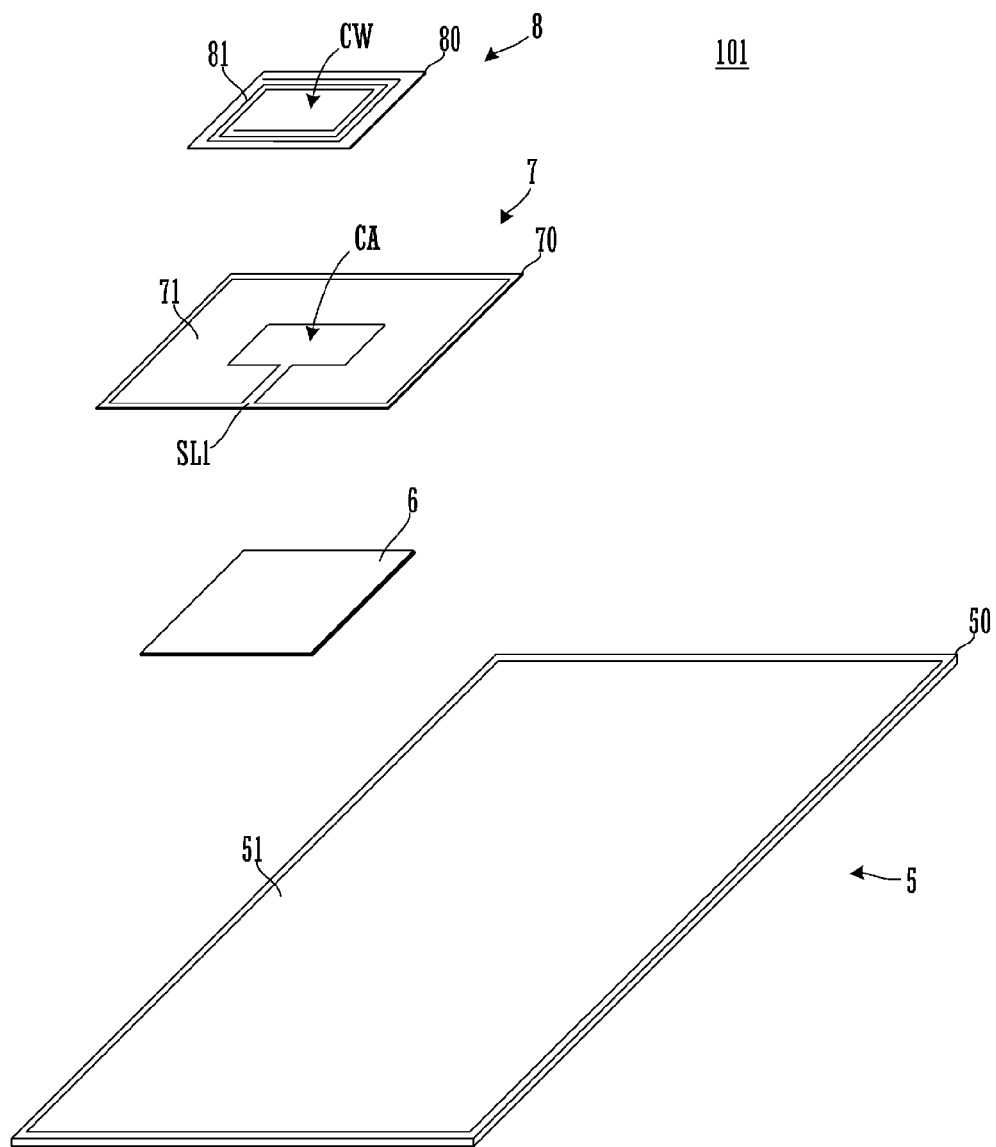
FIG. 2 is an exploded perspective view of an antenna apparatus 101 according to a first preferred embodiment of the present invention.
Figure 3A:
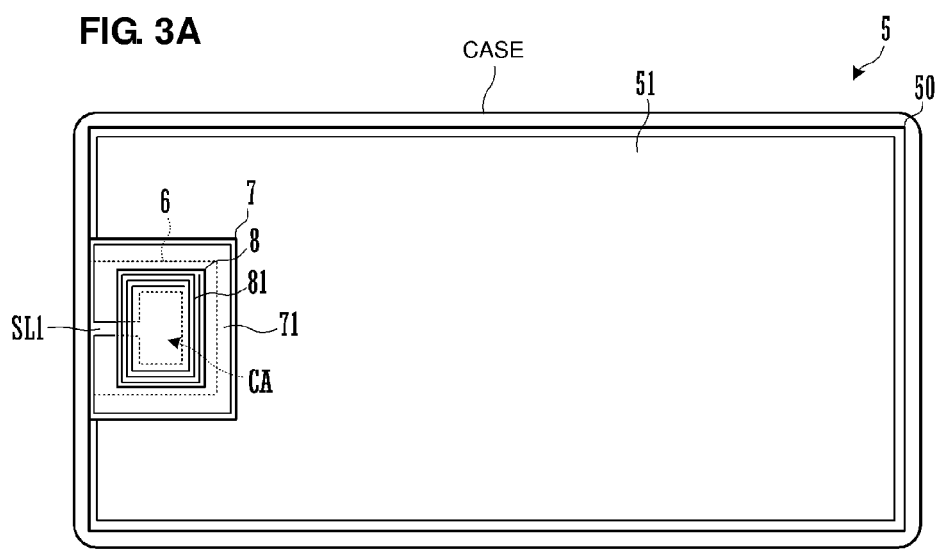
FIG. 3A is a plan view of a communication terminal including the antenna apparatus 101.
Figure 3B:
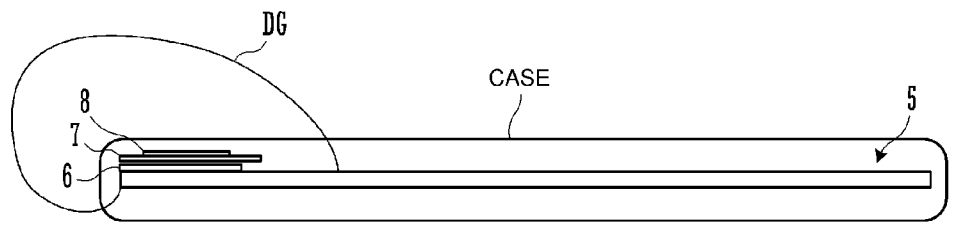
FIG. 3B is an elevation view of the communication terminal.

FIG. 2 is an exploded perspective view of an antenna apparatus 101 according to the first preferred embodiment. FIG. 3A is a plan view of a communication terminal including the antenna apparatus 101. FIG. 3B is an elevation view of the communication terminal.

An antenna module according to the present preferred embodiment is preferably use in NFC (Near Field Communication: short-range communication) such as Felica (registered trademark) and uses the HF band having a center frequency of 13.56 MHz, for example.

The antenna apparatus 101 illustrated in FIG. 2 includes a power supply coil 8, a booster electrode sheet 7, a magnetic sheet 6, and a ground substrate 5 arranged in this order from the top. The antenna apparatus 101 preferably is a laminate including these elements.

The power supply coil 8 is obtained preferably by forming a spiral coil conductor 81 on a flexible substrate 80 that is a rectangular plate-shaped insulating substrate. The spiral coil conductor 81 includes a coil window CW at a winding center, and can therefore emit a magnetic field appropriately.

A connection portion (not illustrated) used for connection between the coil conductor and an external circuit is provided at the flexible substrate 80.

The number of windings (turns) of the coil conductor 81 is determined in accordance with a required inductance, and may be one. In this case, the coil conductor 81 preferably is a loop coil conductor, for example. The coil conductor 81 may be formed in a single plane or a plurality of layers.

The booster electrode sheet 7 includes an insulating substrate 70 and a booster electrode 71 located on the insulating substrate 70. The booster electrode 71 is a C-shaped conductor film, and is disposed so that it faces the power supply coil 8. The booster electrode sheet 7 includes a conductor region covering the coil conductor 81 in plan view, a conductor aperture (nonconductor region) CA covering the coil window CW in plan view, and a slit portion SL1 connecting the outer edge of the conductor region and the conductor aperture CA.

The magnetic sheet 6 is, for example, a ferrite sheet. As will be described later, the magnetic sheet 6 covers the booster electrode sheet 7 so that it covers a region slightly larger than a region including the conductor aperture CA and the slit portion SL1 of the booster electrode 71.

The ground substrate 5 includes an insulating substrate 50 and a ground electrode 51 located on the upper surface of the insulating substrate 50. The ground electrode 51 corresponds to a conductor layer according to a preferred embodiment of the present invention. A printed circuit board disposed in a case of a communication terminal can be used as the ground substrate 5, and a ground electrode disposed at the printed circuit board can be used as the ground electrode 51.

As illustrated in FIGS. 3A and 3B, a laminate including the power supply coil 8, the booster electrode sheet 7, and the magnetic sheet 6 is disposed near the center of one short side of the ground substrate 5.

The power supply coil 8 is disposed so that the coil conductor 81 surrounds the conductor aperture CA of the booster electrode 71. When the coil conductor 81 surrounds the conductor aperture CA of the booster electrode 71 as described above, a region in which the coil conductor 81 and the booster electrode 71 cove in plan view is increased. As a result, the degree of coupling between the power supply coil 8 and the booster electrode 71 is increased. It is desired that the shape of the booster electrode 81 be designed on the basis of the shape of the coil conductor 81.

The power supply coil 8 and the booster electrode 71 are disposed so that the opening of the coil conductor 81 and the conductor aperture CA of the booster electrode 71 at least partly cover in plan view.

The magnetic sheet 6 is disposed so that it covers a region slightly larger than a region including the conductor aperture CA and the slit portion SL1 of the booster electrode 71. That is, the booster electrode 71 includes a region covering the magnetic sheet 6 (a region around the conductor aperture CA and the slit portion SL1) and a region that does not cover the magnetic sheet 6 (the outer edge).

Figure 4:
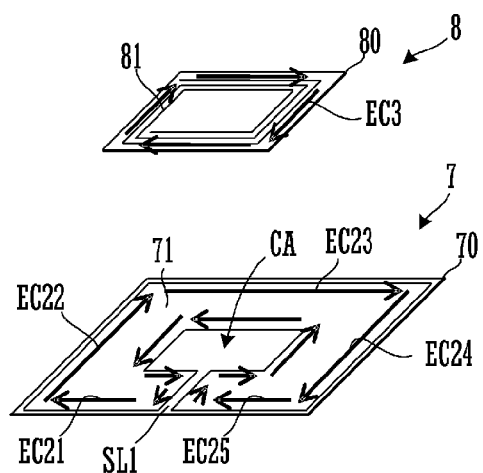
FIG. 4 is a diagram illustrating a current passing through a coil conductor 81 of a power supply coil 8, a current passing through a booster electrode 71 of a booster electrode sheet 7, and a current passing through a ground electrode 51 of a ground substrate 5.
Figure 4:
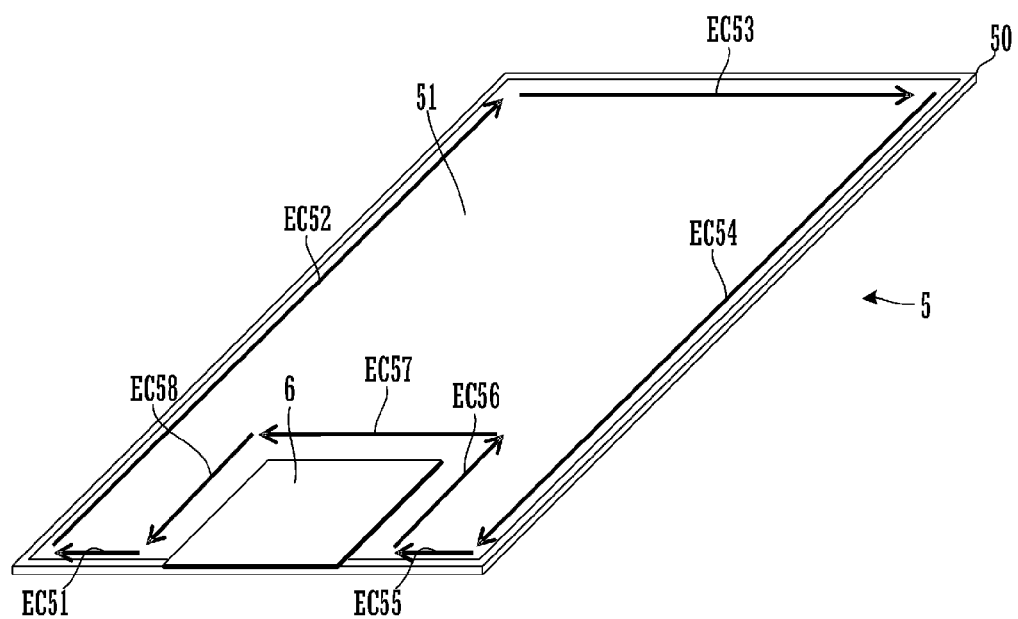

FIG. 4 is a diagram illustrating a current passing through the coil conductor 81 of the power supply coil 8, a current passing through the booster electrode 71 of the booster electrode sheet 7, and a current passing through the ground electrode 51 of the ground substrate 5. These currents are obtained under conditions where the power supply coil 8, the booster electrode sheet 7, the magnetic sheet 6, and the ground substrate 5 are laminated.

As illustrated in FIG. 4, when a current EC3 flows through the coil conductor 81 of the power supply coil 8, a magnetic flux generated from the coil conductor 81 attempts to link to the booster electrode 71. Accordingly, a current (induced current) that interrupts the magnetic flux flows around the conductor aperture CA of the booster electrode 71 in a direction opposite to that of the current passing through the coil conductor 81. The current around the conductor aperture CA flows along the slit portion SL1, and then flows along the periphery of the booster electrode 71, that is, the outer edge of the booster electrode 71. Since the current flows along the periphery of the booster electrode 71, a magnetic field emission area is increased. The booster electrode 71 defines a booster that increases the size of a magnetic flux loop. Thus, the coil conductor 81 of the power supply coil 8 and the booster electrode 71 are coupled mainly via a magnetic field.

On the other hand, the magnetic sheet 6 covers a region slightly larger than a region including the conductor aperture CA and the slit portion SL1 of the booster electrode 71. Accordingly, a magnetic flux generated by a current flowing around the conductor aperture CA of the booster electrode 71 and a current flowing along both sides of the slit portion SL1 of the booster electrode 71 is hardly linked to the ground electrode 51. That is, the magnetic sheet 6 hides the current flowing around the conductor aperture CA of the booster electrode 71 from the ground electrode 51. Induced currents generated by the current flowing around the conductor aperture CA of the booster electrode 71 and the current flowing along the slit portion SL1 of the booster electrode 71 therefore hardly flow through the ground electrode 51.

Induced currents EC58, EC57, and EC56 generated by currents EC22, EC23, and EC24, respectively, flowing along the outer edge of the booster electrode 71 flow through the ground electrode 51 of the ground substrate 5. As a result, following the currents EC56, EC57, and EC58, currents EC51, EC52, EC53, EC54, and EC55 flow along the periphery of the ground electrode 51. That is, a current loop is generated in a path of the currents EC51→EC52→EC53→EC54→EC55→EC56→EC57→EC58. The current loop increases the magnetic field emission area and can increase the size of a magnetic flux loop.

Thus, the booster electrode 71 and the ground electrode 51 are coupled mainly via a magnetic field.

If the magnetic sheet 6 is not present, induced currents generated by the current flowing around the conductor aperture CA of the booster electrode 71 and the current flowing along both sides of the slit portion SL1 of the booster electrode 71 flow through the ground electrode 51. Since these induced currents flow near the induced currents generated by the currents flowing along the periphery of the booster electrode 71 in the direction opposite to that of the induced currents, magnetic fields cancel each other. As a result, the currents EC56, EC57, and EC58 illustrated in FIG. 4 become very small, and the currents EC51, EC52, EC53, EC54, and EC55 flowing along the periphery of the ground electrode 51 also become very small.

In this example, since the magnetic sheet 6 is disposed as illustrated in FIG. 4, the above-described magnetic field cancellation does not occur and a large current flows along the outer edge of the ground electrode 51.

Since the magnetic sheet 6 protrudes from the booster electrode 71 in an extension direction from the conductor aperture to the slit portion of the booster electrode 71 in plan view, the coupling between the current flowing along both sides of the slit portion SL1 of the booster electrode 71 and the ground electrode 51 is reliably prevented. As a result, the induced current generated by the current flowing along both sides of the slit portion SL1 can be prevented from flowing through the ground electrode 51 with certainty. As described previously, the induced current that is generated by the current flowing along the slit portion SL1 and attempts to flow through the ground electrode 51 is a current flowing in a direction opposite to that of the currents EC56, EC57, and EC58. Accordingly, the magnetic sheet 6 can prevent the induced current generated by the current flowing along the slit portion SL1 of the booster electrode 71 from flowing through the ground electrode 51 with more certainty. That is, the occurrence of a current flowing along the outer edge of the ground electrode 51 can be prevented and a large current can flow along the periphery of the booster electrode 71.

Figure 5A:
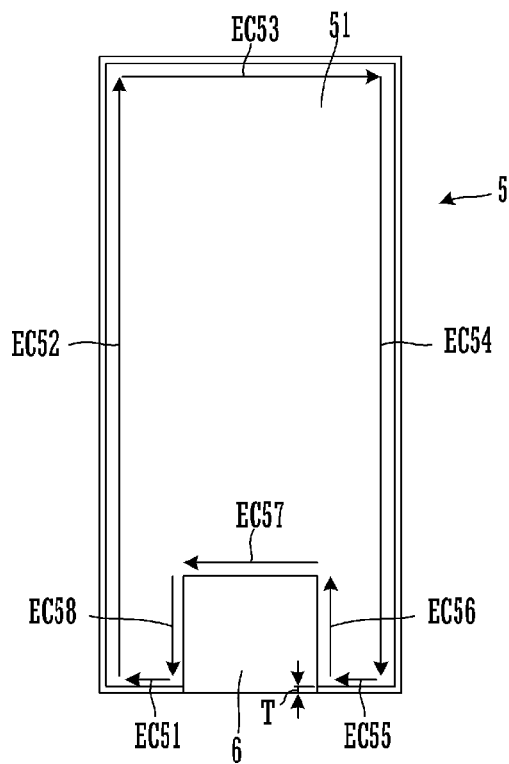
FIGS. 5A and 5B are diagrams illustrating the relationship between the positional relationship between the ground substrate 5 and a magnetic sheet 6 and a current passing through the ground electrode 51.
Figure 5B:
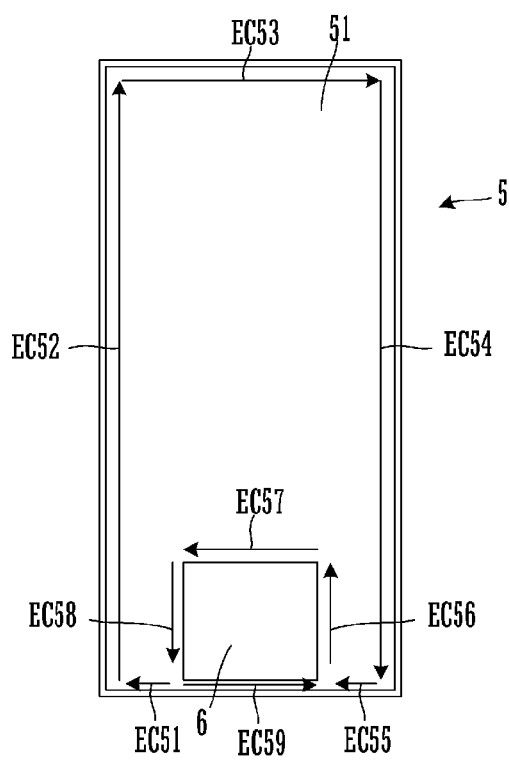

FIG. 5A illustrates the positional relationship between the ground substrate 5 and the magnetic sheet 6 in an antenna apparatus according to the first preferred embodiment. FIG. 5B illustrates a comparative example. As illustrated in FIG. 5B, when the magnetic sheet 6 is inside the outer edge of the ground electrode 51 in plan view, the current flowing along the periphery of the magnetic sheet 6 includes a loop of the currents EC56→EC57→EC58→a current EC59. That is, a shortcut current flows. On the other hand, as illustrated in FIG. 5A, when the magnetic sheet 6 protrudes from the outer edge of the ground electrode 51 in the extension direction from the conductor aperture to the slit of the booster electrode 71 by a protrusion distance T in plan view, the occurrence of the above-described shortcut current is prevented and the currents EC51, EC52, EC53, EC54, and EC55 flowing along the periphery of the ground electrode 51 become large. The reason for this is that an inductance component is increased in a region where the magnetic sheet is close to the ground electrode 51. That is, the large currents EC51, EC52, EC53, EC54, and EC55 flow in a path along the periphery of the ground electrode while avoiding the region. The magnetic sheet 6 may reach just the outer edge of the ground electrode 51 in the extension direction from the conductor aperture to the slit of the booster electrode 71. The protrusion distance T is determined in consideration of the accuracy of attachment of the magnetic sheet 6 to the ground electrode 51.

Figure 6:
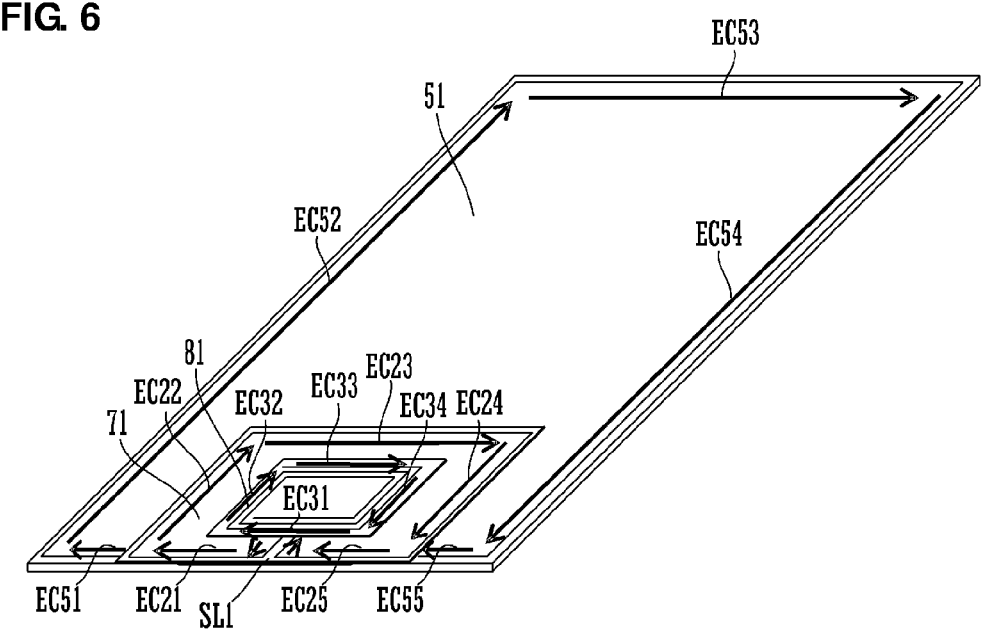
FIG. 6 is a diagram illustrating currents flowing in a state in which the power supply coil 8, the booster electrode sheet 7, the magnetic sheet 6, and the ground substrate 5 are laminated.

FIG. 6 is a diagram illustrating currents flowing in a state in which the power supply coil 8, the booster electrode sheet 7, the magnetic sheet 6, and the ground substrate 5 are laminated.

As illustrated in FIG. 6, the directions of a current flowing through the coil conductor 81, a current flowing through a main portion (other than both sides of the slit portion SL1) of the booster electrode 71, and a current flowing through the ground electrode 51 are the same, and magnetic fields generated by these currents are added (these currents do not cancel one another). Accordingly, as compared with a case where the power supply coil 8 is used alone and a case where the combination of the power supply coil 8 and the booster electrode sheet 7 is used, a higher antenna gain can be obtained.

Referring to FIG. 3B, a curve DG represents an emitted magnetic field strength pattern that is the directional characteristic of the antenna apparatus 101. As illustrated in the drawing, directivity is high in a direction in which the slit portion SL1 of the booster electrode 71 is present, and the center of the directivity is shifted in an oblique direction with respect to the position of the laminate including the power supply coil 8, the booster electrode sheet 7, and the magnetic sheet 6 as viewed from the center of the ground electrode 51. The reason for this is that the intensity distribution of a current flowing through the ground electrode 51 is concentrated at a position nearer to the laminate than to the center of the ground electrode 51 because not only a magnetic field generated from the ground electrode 51 but also magnetic fields generated from the coil conductor 81 and the booster electrode 71 contribute to emission. Accordingly, when the slit portion SL1 of the booster electrode 71 is disposed so that it is directed toward the tip of a case of a mobile telephone terminal, such mobile telephone terminals are suitable for use in communication between them diagonally close to each other.

In the first preferred embodiment, the magnetic sheet 6 covers a region slightly larger than the region including the conductor aperture CA and the slit portion SL1 of the booster electrode 71 in plan view, but may just cover the conductor aperture CA and the slit portion SL1 of the booster electrode 71.

A current flowing along the outer edge of the booster electrode 71 and a current flowing around the conductor aperture CA are opposite in direction. Therefore, in the intensity distribution of a current flowing through the booster electrode 71, a line indicating the current value of zero is generated at a midpoint between the outer edge and the inner edge (the outer edge of the conductor aperture CA) of the booster electrode 71. Ideally, the size and position of the magnetic sheet 6 are determined so that the outer edge of the magnetic sheet 6 matches the line indicating the current value of zero.

Thus, since the booster electrode 71 includes a region (coupling region) that does not cover the magnetic sheet 6 in plan view, the booster electrode 71 functions as a booster.

In the present preferred embodiment, the ground electrode (conductor layer) 51, the booster electrode 71, and the coil conductor 81 preferably define and function as radiating elements. However, among them, the conductor layer is a main radiating element, for example.

Second Preferred Embodiment

Figure 7:
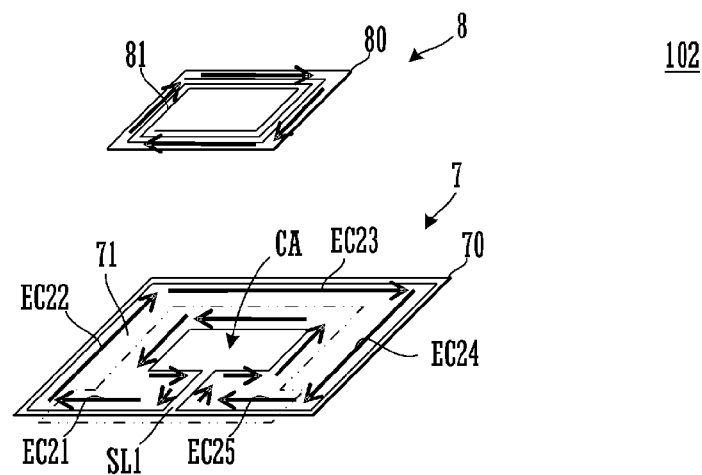
FIG. 7 is an exploded perspective view of an antenna apparatus 102 according to a second preferred embodiment of the present invention.
Figure 7:
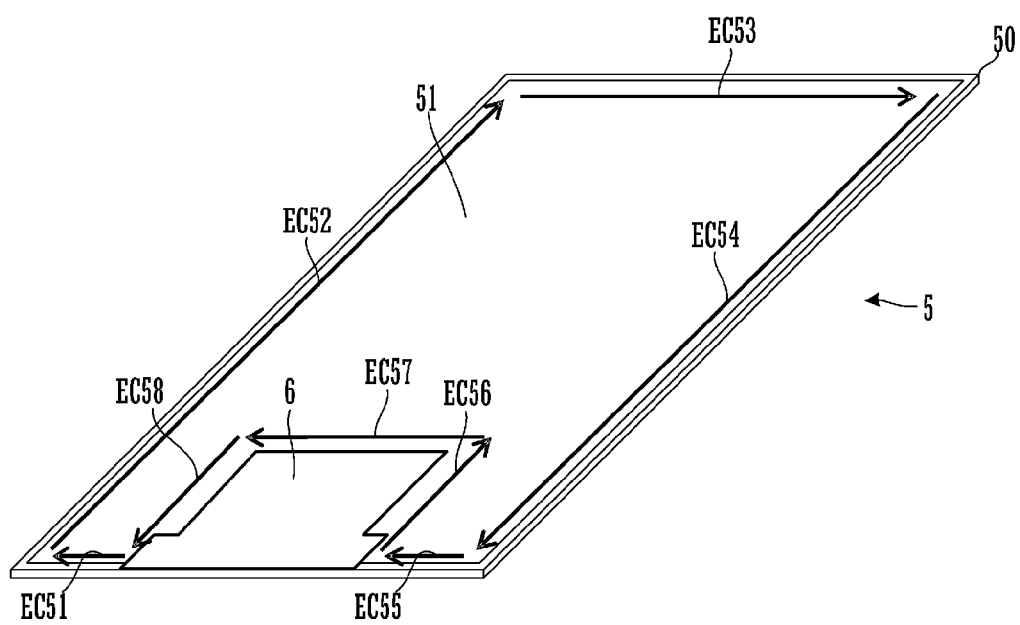

FIG. 7 is an exploded perspective view of an antenna apparatus 102 according to the second preferred embodiment.

The antenna apparatus 102 illustrated in FIG. 7 includes the power supply coil 8, the booster electrode sheet 7, the magnetic sheet 6, and the ground substrate 5 arranged in this order from the top. The antenna apparatus 102 preferably is the laminate of these elements.

The shape of the magnetic sheet 6 is different from the shape of the magnetic sheet 6 in the antenna apparatus 101 according to the first preferred embodiment illustrated in FIG. 2. Referring to FIG. 7, a chain double-dashed line represents a position at which the magnetic sheet 6 covers the booster electrode sheet 7. The magnetic sheet 6 not only covers the conductor aperture CA and the slit portion SL1 of the booster electrode 71, but also extends to a region where the slit portion SL1 divides the periphery, that is, a region where the currents EC21 and EC25 flow.

In the case of the above-described structure, induced currents generated by the currents EC21 and EC25, respectively, hardly flow through the ground electrode 51. The induced currents that are generated by the currents EC21 and EC25, respectively, and attempt to flow through the ground electrode 51 is opposite in direction to the currents EC51, EC52, EC53, EC54, and EC55. Accordingly, when the magnetic sheet 6 prevents the induced currents generated by the currents EC21 and EC25, respectively, flowing through the booster electrode 71 from flowing through the ground electrode 51, an antenna gain is further increased.

Third Preferred Embodiment

Figure 8:
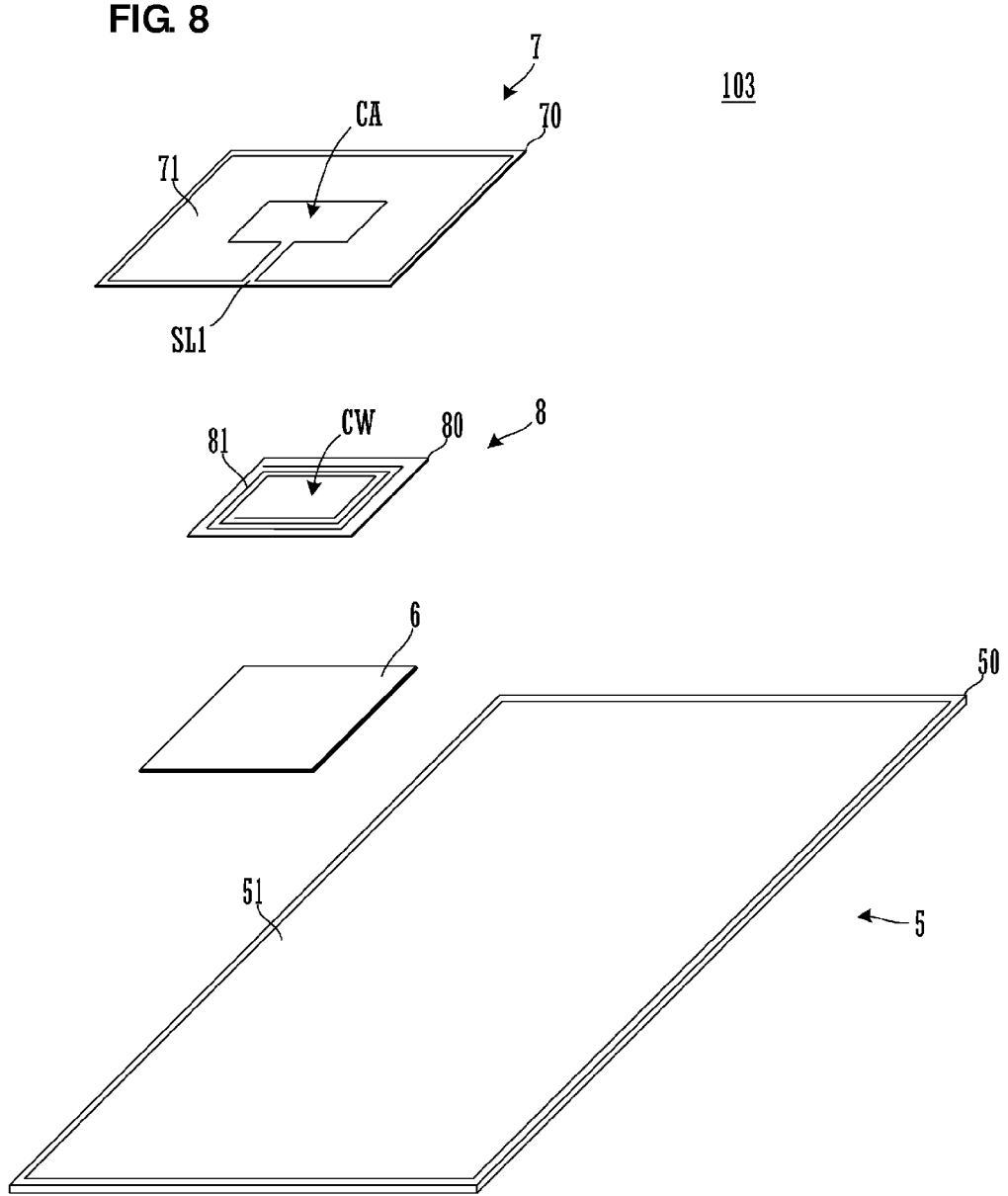
FIG. 8 is an exploded perspective view of an antenna apparatus 103 according to a third preferred embodiment of the present invention.

FIG. 8 is an exploded perspective view of an antenna apparatus 103 according to the third preferred embodiment.

The antenna apparatus 103 illustrated in FIG. 8 includes the booster electrode sheet 7, the power supply coil 8, the magnetic sheet 6, and the ground substrate 5 arranged in this order from the top. The antenna apparatus 103 preferably is the laminate of these elements.

The positional relationship between the booster electrode sheet 7 and the power supply coil 8 is different from that in the antenna apparatus 101 according to the first preferred embodiment illustrated in FIG. 2. Thus, the power supply coil 8 may be present between the booster electrode sheet 7 and the magnetic sheet 6. That is, a current flowing around the conductor aperture CA of the booster electrode 71 and a current flowing along both sides of the slit portion SL1 of the booster electrode 71 are interrupted by the magnetic sheet 6, and only a current flowing along the outer edge of the booster electrode 71 is practically guided to the ground electrode 51.

Since the magnetic sheet 6 is larger than the power supply coil 8, a current flowing through the coil conductor 81 of the power supply coil 8 becomes invisible from the ground electrode 51. That is, the magnetic sheet 6 hides the current flowing through the coil conductor 81. Accordingly, it is possible to prevent a reactive induced current (an induced current in the opposite direction) from flowing through the ground electrode 51.

Fourth Preferred Embodiment

Figure 9A:
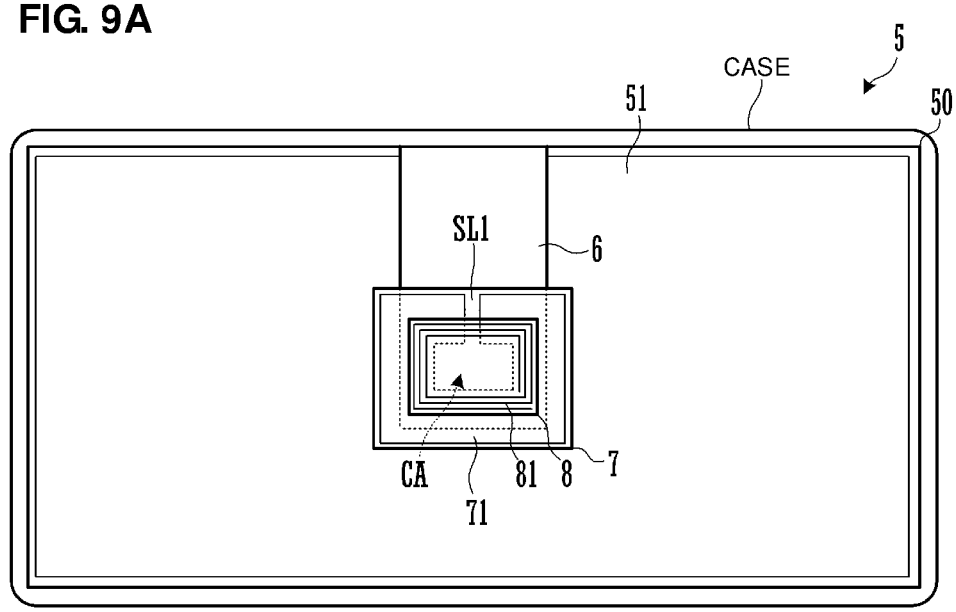
FIG. 9A is a plan view of an antenna apparatus 104 according to a fourth preferred embodiment of the present invention.
Figure 9B:
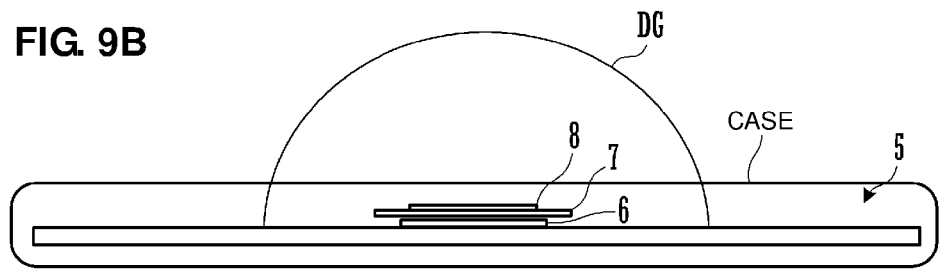
FIG. 9B is an elevation view of the antenna apparatus 104.

FIG. 9A is a plan view of an antenna apparatus 104 according to the fourth preferred embodiment, and FIG. 9B is an elevation view of the antenna apparatus 104. In this example, the laminate including the power supply coil 8, the booster electrode sheet 7, and the magnetic sheet 6 is disposed at substantially the center of the ground substrate 5. The magnetic sheet 6 is disposed in the extension direction from the conductor aperture to the slit portion SL1 of the booster electrode 71 formed on the booster electrode sheet 7. The leading end of the magnetic sheet 6 reaches the center of one long side of the ground substrate 5.

Unlike in the example according to the first preferred embodiment illustrated in FIGS. 3A and 3B, the laminate including the power supply coil 8, the booster electrode sheet 7, and the magnetic sheet 6 is disposed at substantially the center of the ground substrate 5, and the magnetic sheet 6 extends for a relatively long distance to the edge of the ground electrode 51. In order to prevent the magnetic sheet 6 from being too long, the slit portion SL1 of the booster electrode 71 is directed toward the long side of the ground substrate 5.

Referring to FIG. 9B, the curve DG represents an emitted magnetic field strength pattern that is the directional characteristic of the antenna apparatus 104. As illustrated in the drawing, since the power supply coil 8, the booster electrode sheet 7, the magnetic sheet 6, and the ground electrode 51 are substantially rotationally symmetric with respect to the center of the ground electrode 51, the center of the directivity is directed in the direction of the normal to the ground electrode 51. Such directivity characteristic is suitable for use in communication between an antenna in a reader/writer and an antenna apparatus facing the antenna.

Fifth Preferred Embodiment

Figure 10:
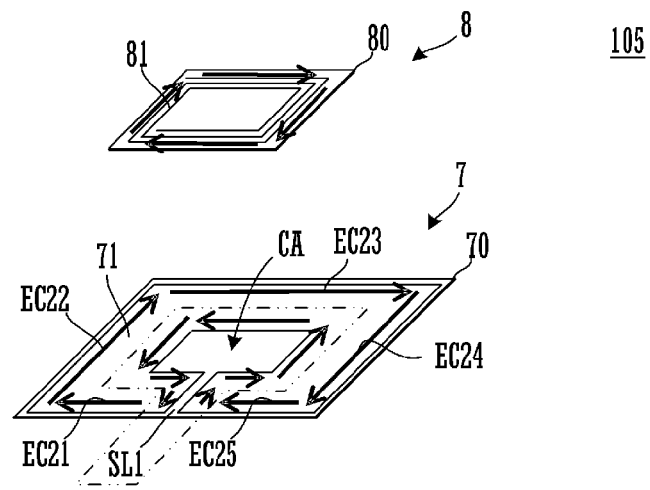
FIG. 10 is an exploded perspective view of an antenna apparatus 105 according to a fifth preferred embodiment of the present invention.
Figure 10:
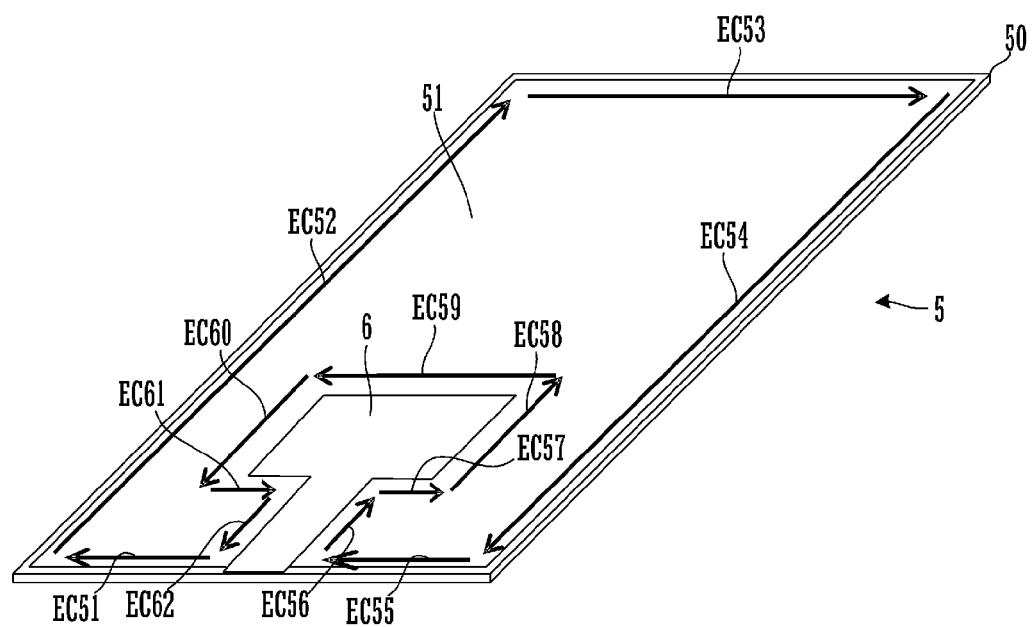

FIG. 10 is an exploded perspective view of an antenna apparatus 105 according to the fifth preferred embodiment.

The antenna apparatus 105 illustrated in FIG. 10 includes the power supply coil 8, the booster electrode sheet 7, the magnetic sheet 6, and the ground substrate 5 arranged in this order from the top. The antenna apparatus 105 preferably is the laminate of these elements.

The shape of the magnetic sheet 6 is different from the shape of the magnetic sheet 6 in the antenna apparatus 101 according to the first preferred embodiment illustrated in FIG. 2. Referring to FIG. 10, a chain double-dashed line represents a position at which the magnetic sheet 6 covers the booster electrode sheet 7. The magnetic sheet 6 covers the conductor aperture CA and the slit portion SL1 of the booster electrode 71, and the width of a portion of the magnetic sheet 6 covering the slit portion SL1 is small.

Unlike in the first preferred embodiment, the set of the power supply coil 8, the booster electrode sheet 7, and the magnetic sheet 6 is disposed at a position that is spaced apart from the edge of the ground electrode 51 in a direction in which the center of the ground electrode 51 is present.

In the case of the above-described structure, induced currents EC61 and EC57 generated by the currents EC21 and EC25, respectively, flow through the ground electrode 51. Since the width of the portion of the magnetic sheet 6 covering the slit portion SL1 is small, the currents EC56 and EC62 flow along both sides of the thin portion of the magnetic sheet 6. A current loop is generated in a path of the currents EC51→EC5→EC53→EC54→EC55→EC56→EC57→EC58→EC59→EC60→EC61→EC62. The current loop increases the magnetic field emission area and also increases the size of a magnetic flux loop.

Sixth Preferred Embodiment

Figure 11:
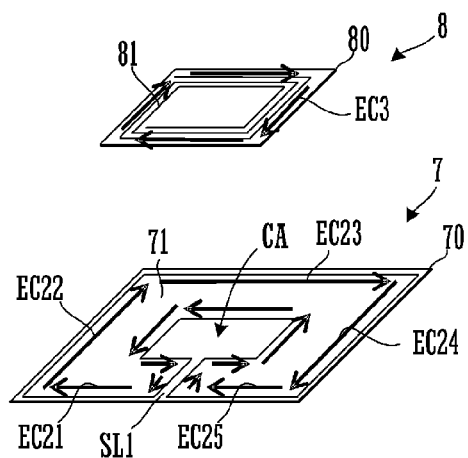
FIG. 11 is an exploded perspective view illustrating currents flowing through the coil conductor 81 of the power supply coil 8, the booster electrode 71 of the booster electrode sheet 7, and the ground electrode 51 of the ground substrate 5 in a comparative example of an antenna apparatus according to a sixth preferred embodiment of the present invention.
Figure 11:
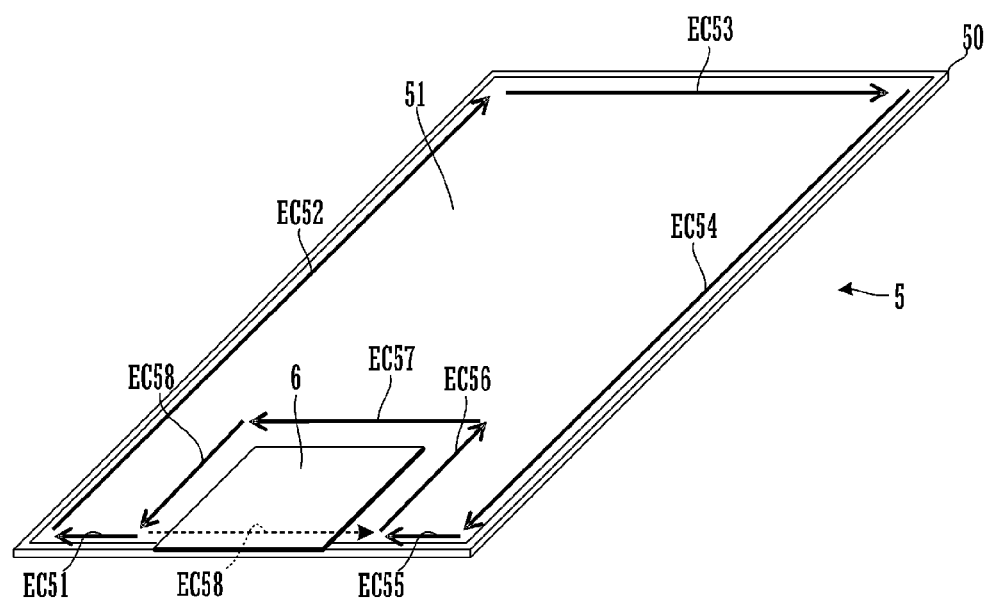

An antenna apparatus according to the sixth preferred embodiment will be described with reference to FIGS. 11 to 13. FIG. 11 is an exploded perspective view illustrating currents flowing through the coil conductor 81 of the power supply coil 8, the booster electrode 71 of the booster electrode sheet 7, and the ground electrode 51 of the ground substrate 5 in a comparative example of an antenna apparatus according to the sixth preferred embodiment.

A structure similar to the structure according to the first preferred embodiment illustrated in FIG. 4 is provided. When the current interruption effect of the magnetic sheet 6 is weak, a shortcut current EC58 represented by a broken line in FIG. 11 may flow. In this case, since a magnetic field generated by a current flowing through the booster electrode 71 is partially eliminated, the characteristic is deteriorated.

Figure 12:
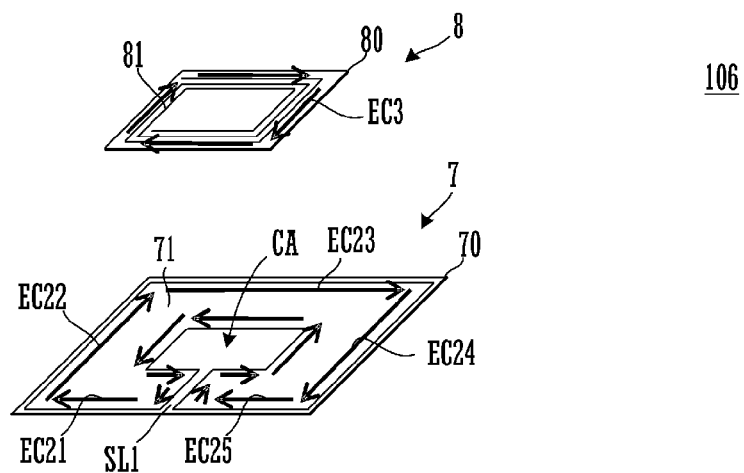
FIG. 12 is an exploded perspective view illustrating currents flowing through the coil conductor 81 of the power supply coil 8, the booster electrode 71 of the booster electrode sheet 7, and the ground electrode 51 of the ground substrate 5 in an antenna apparatus 106 according to the sixth preferred embodiment of the present invention.
Figure 12:
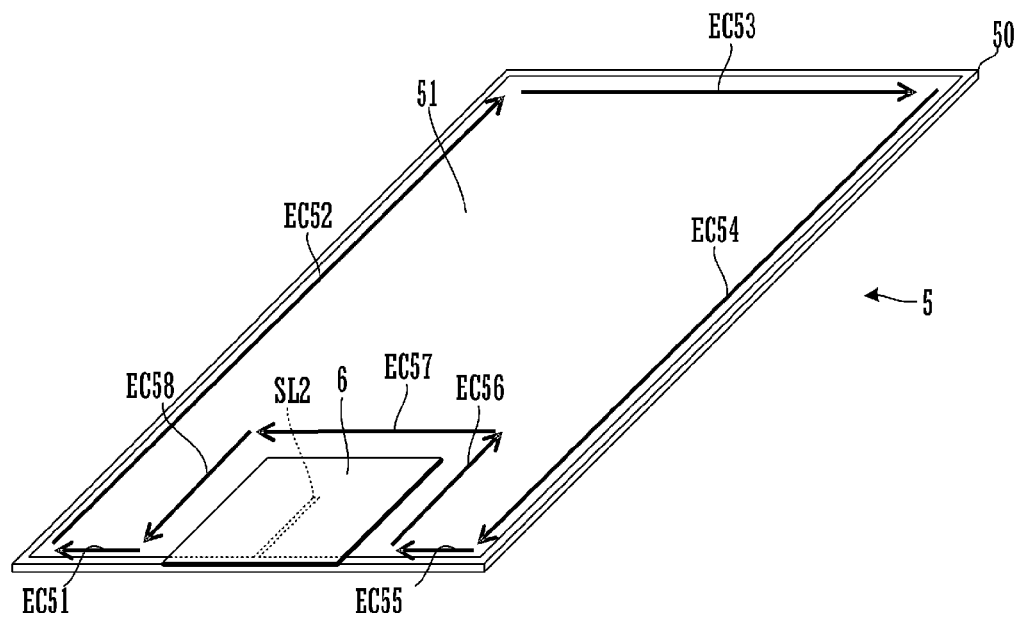

FIG. 12 is an exploded perspective view illustrating currents flowing through the coil conductor 81 of the power supply coil 8, the booster electrode 71 of the booster electrode sheet 7, and the ground electrode 51 of the ground substrate 5 in an antenna apparatus 106 according to the sixth preferred embodiment. A slit portion SL2 is disposed at the ground electrode 51 so that it interrupts the current EC58 illustrated in FIG. 11. With this structure, the occurrence of the shortcut current EC58 can be prevented with certainty.

Figure 13:
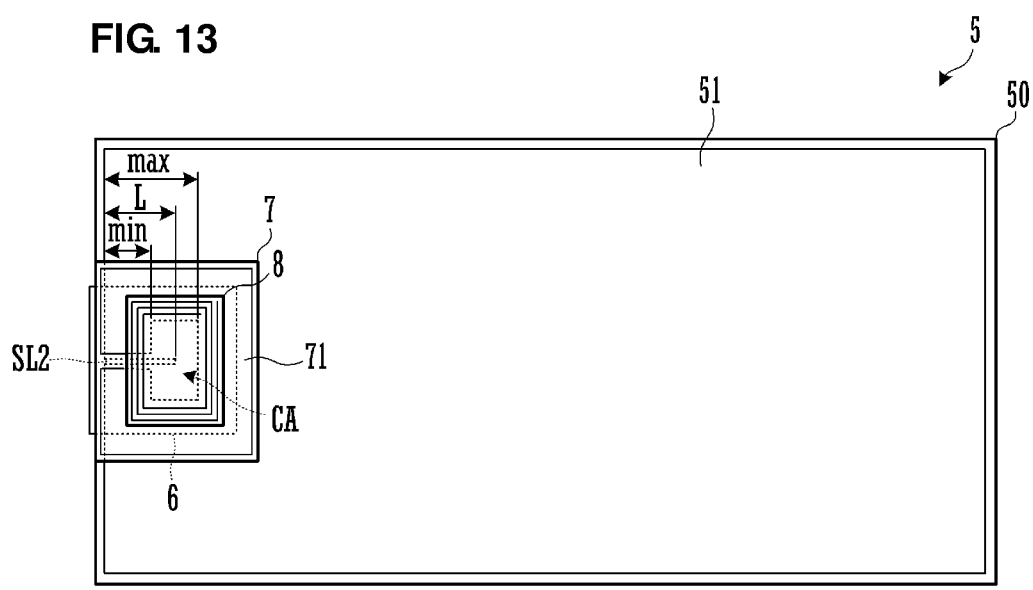
FIG. 13 is a plan view of the antenna apparatus 106 according to the sixth preferred embodiment of the present invention.

FIG. 13 is a plan view of the antenna apparatus 106. As illustrated in FIG. 13, the slit portion SL2 of the ground electrode 51 is preferably arranged so that it extends in a direction in which the slit portion SL1 of the booster electrode 71 extends and covers the slit portion SL1. A length L of the slit portion SL2 is preferably set so that the leading end of the slit portion SL2 is inside the conductor aperture CA. Referring to FIG. 13, a dimension min represents an example of the minimum dimension of the slit portion SL2, and a dimension max represents an example of the maximum dimension of the slit portion SL2.

When the slit portion SL2 is provided at the ground electrode 51, a necessary induced current can be generated and the occurrence of a shortcut current can be prevented with more certainty.

The directional characteristic of an antenna apparatus can be changed by changing the shape of a magnetic sheet. Alternatively, the directional characteristic of an antenna apparatus can be changed by adjusting the position, width, and length of the slit portion SL1. Since a large potential difference is obtained at the slit portion SL1 and a strong magnetic field is emitted, the directional characteristic can be changed by changing the position of the slit portion. For example, the directional characteristic is improved by reducing the width of the slit portion SL1 or increasing the length of the slit portion SL1.

The conductor aperture CA and the slit portion SL1 of the booster electrode may have the same width.

The magnetic sheet may not necessarily be a single sintered ferrite plate, and may be obtained by attaching a double-faced adhesive sheet for flexible substrate attachment and a single-faced adhesive sheet for protection to both surfaces of a sintered magnetic substance and dividing the sintered magnetic substance into small pieces. The sintered magnetic substance may not necessarily be used, and a composite preferably made of ferrite and a resin or a metal magnetic substance may be used.

An antenna apparatus using an HF band having a center frequency of 13.56 MHz has been described as a non-limiting example in the above-described preferred embodiments. However, the present invention can operate in a frequency band other than the HF band. For example, an antenna apparatus according to a preferred embodiment of the present invention can be used as an antenna for an RFID tag using the 900 MHz UHF band. In this case, the coil conductor of the power supply coil and the booster electrode are coupled mainly via an electromagnetic field, and the booster electrode and the ground electrode are coupled mainly via an electromagnetic field.

The positional relationship between the power supply coil and the booster electrode may be changed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An antenna apparatus comprising:
   a power supply coil including a loop or spiral coil conductor including a coil window at a winding center;
   a booster electrode that partially overlaps with the coil conductor;
   a conductor layer facing the power supply coil or the booster electrode; and
   a magnetic layer that overlaps a portion of an outer periphery edge of the conductor layer and is disposed between the booster electrode and the conductor layer; wherein the booster electrode includes a portion that protrudes outside of an outer periphery of the magnetic layer and overlaps with the conductor layer in a plan view of the conductor layer; and an induced current flowing in a same direction as that of a current flowing around the booster electrode is generated at the conductor layer.

2. The antenna apparatus according to claim 1, wherein the booster electrode includes a conductor aperture and a slit portion; and the magnetic layer covers the conductor aperture and the slit portion of the booster electrode in the plan view of the conductor layer.

3. The antenna apparatus according to claim 1, wherein the booster electrode includes a conductor aperture and a slit portion; and the magnetic layer protrudes from the booster electrode in an extension direction from the conductor aperture to the slit portion of the booster electrode in the plan view of the conductor layer.

4. The antenna apparatus according to claim 3, wherein the magnetic layer extends to the outer periphery of the conductor layer or a position spaced apart from the outer periphery of the conductor layer in the extension direction from the conductor aperture to the slit portion of the booster electrode in the plan view of the conductor layer.

5. The antenna apparatus according to claim 1, wherein the booster electrode, the power supply coil, the magnetic layer, and the conductor layer are arranged in this order respectively from top to bottom.

6. The antenna apparatus according to claim 1, wherein the power supply coil and the booster electrode are coupled to each other via an electromagnetic field or a magnetic field, and the booster electrode and the conductor layer are coupled to each other via an electromagnetic field or a magnetic field.

7. The antenna apparatus according to claim 1, wherein the power supply coil and the conductor layer are coupled to each other via an electromagnetic field or a magnetic field.

8. A communication terminal comprising an antenna apparatus including:
- a power supply coil including a loop or spiral coil conductor including a coil window at a winding center;
- a booster electrode that partially overlaps with the coil conductor;
- a conductor layer facing the power supply coil or the booster electrode; and
- a magnetic layer that overlaps a portion of an outer periphery edge of the conductor layer and is disposed between the booster electrode and the conductor layer; wherein the booster electrode includes a portion that protrudes outside of an outer periphery of the magnetic layer and overlaps with the conductor layer in a plan view of the conductor layer; and an induced current flowing in a same direction as that of a current flowing around the booster electrode is generated at the conductor layer.

\* \* \* \* \*